United States Patent [19]
Sowell et al.

[11] Patent Number: 5,678,888
[45] Date of Patent: Oct. 21, 1997

[54] SHOPPING CART CHILD SEAT COVER

[76] Inventors: Christy-Anne M. Sowell; James A. Sowell, III, both of 1920 SW. Ember St., Port St. Lucie, Fla. 34953

[21] Appl. No.: 731,448

[22] Filed: Oct. 15, 1996

[51] Int. Cl.[6] .................................................. A47C 1/10
[52] U.S. Cl. .................... 297/256.17; 297/219.12; 297/229; 297/228.13; 280/33.992
[58] Field of Search .................... 297/256.17, 219.12, 297/229, 228.13, 218.1, 219.1, 228.12; 280/33.992, 33.993

[56] References Cited

U.S. PATENT DOCUMENTS

| | | | |
|---|---|---|---|
| 3,578,380 | 5/1971 | Jacobus | 297/229 |
| 3,866,649 | 2/1975 | Bringmann | 150/52 R |
| 4,204,695 | 5/1980 | Salzman | 280/33.993 |
| 4,324,430 | 4/1982 | Dimas et al. | 280/33.993 |
| 4,416,462 | 11/1983 | Thompson | 280/33.99 B |
| 4,655,502 | 4/1987 | Houllis | 297/229 |
| 4,666,207 | 5/1987 | Quartano | 297/229 |
| 4,674,758 | 6/1987 | Valley et al. | 280/33.993 |
| 4,805,937 | 2/1989 | Boucher et al. | 280/33.992 |
| 5,238,293 | 8/1993 | Gibson | 297/229 |
| 5,330,250 | 7/1994 | Reyes | 297/229 |
| 5,425,546 | 6/1995 | Gerber et al. | 280/33.992 |

Primary Examiner—Peter M. Cuomo
Assistant Examiner—Anthony D. Barfield
Attorney, Agent, or Firm—Edward M. Livingston, Esq.

[57] ABSTRACT

A shopping-cart child-seat cover is made from pliable material and has a seat section (1), a back section (4), a front section (8) and two side sections (10, 12). The seat section of the child-seat cover is sized and shaped to fit on top of a seat bottom (2) of a child-seat portion (7) of a shopping cart (3). Cover fasteners (15, 16, 17) are positioned on portions of the back section of the child-seat cover at which a portion of the back section that is positioned against a back wall (5) of the child seat engages a container-side portion (6) of the back section that hangs down from over a top of the back wall of the child seat. In like manner, cover fasteners are positioned on portions of the front and side sections (9, 11, 13) of the child-seat cover at which a portion of the front section that is positioned against a front wall of the child seat engages an outside portion of the front section that hangs down from over a top of the front wall of the child seat and at which portions of the side sections that are positioned against side walls of the child seat engage outside portions of the side sections that hang down from over tops of the side walls of the child seat. The pliable material is designedly washable, soft and cushiony thick. Optional features, including a safety seat belt (21), bottle holder (18), toy holders (19) and cushion (22), are provided.

20 Claims, 3 Drawing Sheets

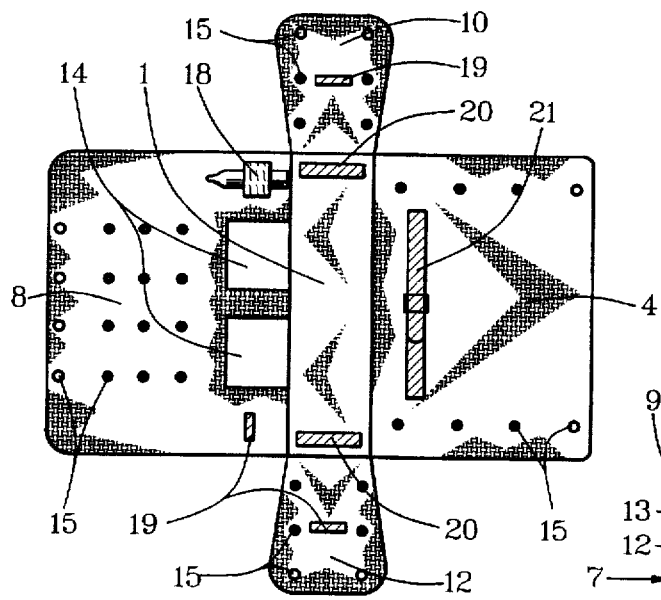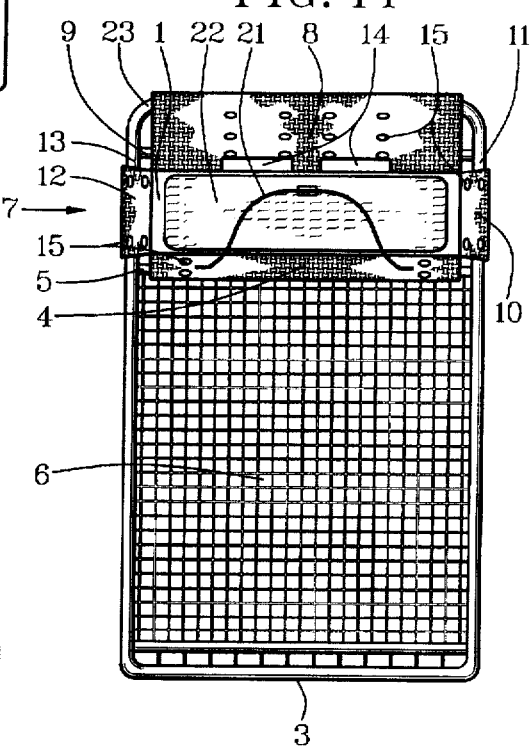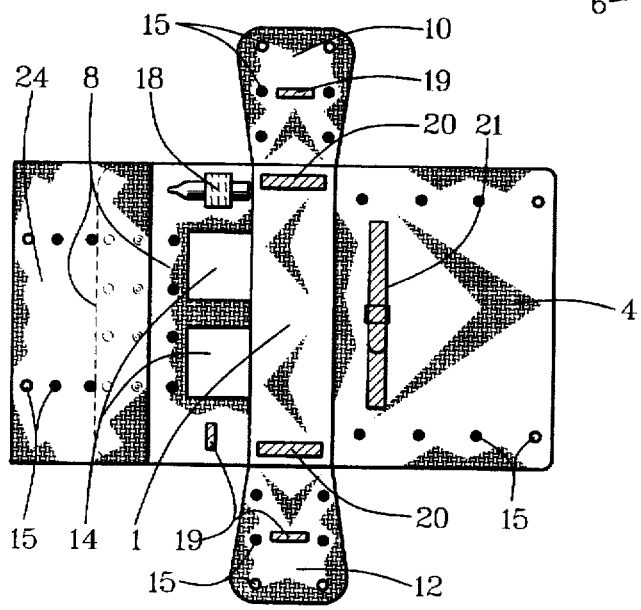

SHOPPING CART CHILD SEAT COVER

BACKGROUND OF THE INVENTION

This invention relates to covers for child seats on shopping carts.

Placing infants or young children in child seats on shopping carts has long presented problems of sanitation, comfort and entertainment of the child in the seat while a parent shops. Typically and very normally, the child will teethe on rods around their seat and pick up germs left there by many people who will have handled the shopping cart previously. Hardness of rods under the child in typical folding metal seats will irritate them into squirming and seeking alternatives to their discomfort. Peaceful rest becomes difficult for them. Thus, children who must sit in shopping-cart child seats can and often get sickness infections and vent their irritation on their caretakers in addition. All of this could be prevented with an appropriate shopping-cart child-seat cover.

Many parents have been aware of this and have devised a wide variety of solutions. Consequently, this is a crowded art with relatively minor differentiations. Some solutions are too complicated. Others are lacking in one or more aspects that would cause a choosy parent to choose them. None have provided the ease of handling, washability, comfort, sanitary protection and low cost made possible by this invention.

Different but related solutions to shopping-cart child-seat problems are described in the following patent documents. U.S. Pat. No. 5,330,250, issued to Reyes on Jul. 19, 1994, provided an elaborate seat with cushions all around and under an infant in a shopping-cart seat. Its elaborateness appears to have made it too difficult for a busy and economy-minded parent to handle and to keep clean. U.S. Pat. No. 5,238,293, issued to Gibson on Aug. 24, 1993, described a shopping-cart-seat cover that was limited to ear-shaped appendages, an elastic attachment strip, a safety buckle and other features that made it nondurable when washed and hard to use. U.S. Pat. No. 4,805,937, issued to Boucher, et al. on Feb. 21, 1989, taught a handle cover to protect against picking up germs from teething on shopping-cart handles. U.S. Pat. No. 4,655,502, issued to Houllis on Apr. 7, 1987, described a rectangular cushion with a T-formation for attachment to a seat-back edge of a shopping cart. U.S. Pat. No. 4,666,207, issued to Quartano on May 19, 1987, taught a shopping-cart cushion that would fit also into a child's car seat, but was not easily washable and had no side protection. U.S. Pat. No. 4,416,462, issued to Thompson on Nov. 22, 1983, taught a convertible bed that was attachable to a shopping cart but not washable and not protective at sides. U.S. Pat. No. 3,578,380, issued to Jacobus on May 11, 1971, taught a pouch-like insert with side attachments for a shopping-cart seat.

SUMMARY OF THE INVENTION

In light of need for improvement of child-containment conditions in shopping-carts, objects of this invention are to provide a shopping-cart child-seat cover which:

Can be carried easily in a purse or infant-care bag;

Can be positioned in and removed from a shopping-cart child seat quickly, easily and conveniently;

Provides reliable comfort in all directions of child contact with the child seat;

Allows the child to sit comfortably in the child seat;

Is adjustable to child seats in all conventional shopping carts;

Can be washed easily throughout a long use life; and

Is inexpensive to produce.

This invention accomplishes these and other objectives with a shopping-cart child-seat cover made from pliable material and having a seat section, a back section, a front section and two side sections. The seat section of the child-seat cover is sized and shaped to fit on top of a seat bottom of a child seat. The back section of the child-seat cover is sized and shaped to fit against and over a top of a back wall of a child seat that separates a container portion of the shopping cart from the child seat. The front section of the child-seat cover is sized and shaped to fit against and over a top of a front wall of the child seat that, at a position vertically under the child seat, is a back wall of a container portion of the shopping cart, the child seat facing rearwardly in a top portion of the shopping cart. The front section of the child-seat cover has two separated leg orifices. One of the two side sections of the child-seat cover is attached to each side of the seat section of the child-seat cover, the two side sections being sized and shaped to fit against and over tops of side walls of the child seat. Cover fasteners are positioned on portions of the back section of the child-seat cover at which a portion of the back section that is positioned against a back wall of the child seat engages a container-side portion of the back section that hangs down from over a top of the back wall of the child seat. In like manner, cover fasteners are positioned on portions of the front and side sections of the child-seat cover at which a portion of the front section that is positioned against a front wall of the child seat engages an outside portion of the front section that hangs down from over a top of the front wall of the child seat and at which portions of the side sections that are positioned against side walls of the child seat engage outside portions of the side sections that hang down from over tops of the side walls of the child seat. The pliable material is designedly washable and/or cleanable, soft and cushiony thick.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 12 is a top view of a child-seat cover with a handle cover extended from a front section;

FIG. 13 is a top view of a child-seat cover with a handle cover attached directly to a front section that is separably attachable to a front wall of a shopping-cart child seat; and FIG. 14 is a top view of a shopping cart with either the FIG. 12 or the FIG. 13 child-seat cover on it.

DESCRIPTION OF PREFERRED EMBODIMENT

Figure 1:
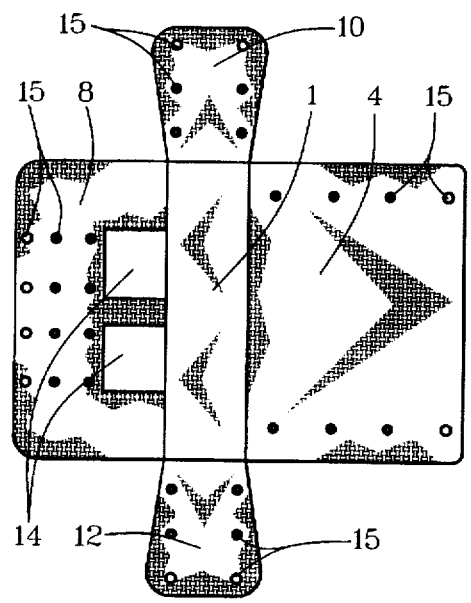
FIG. 1 is a top plan view of a shopping-cart child-seat cover without accessory attachments.
Figure 2:
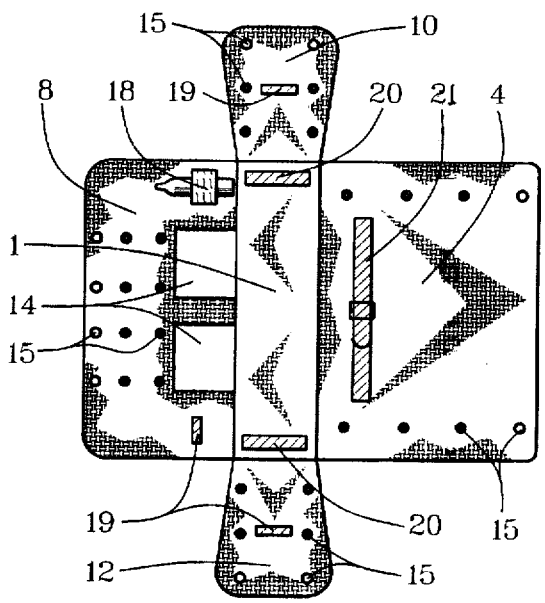
FIG. 2 is the FIG. 1 illustration with select accessory attachments.
Figure 3:
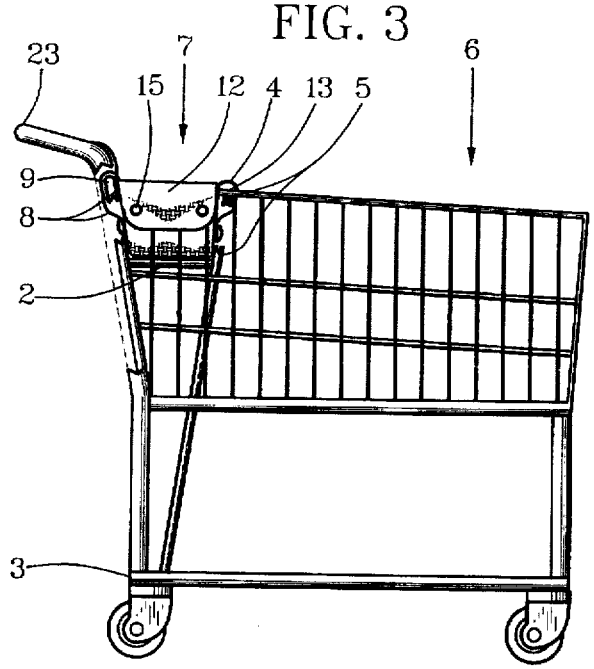
FIG. 3 is a side elevation view of a shopping cart on which a child-seat cover is positioned.
Figure 4:
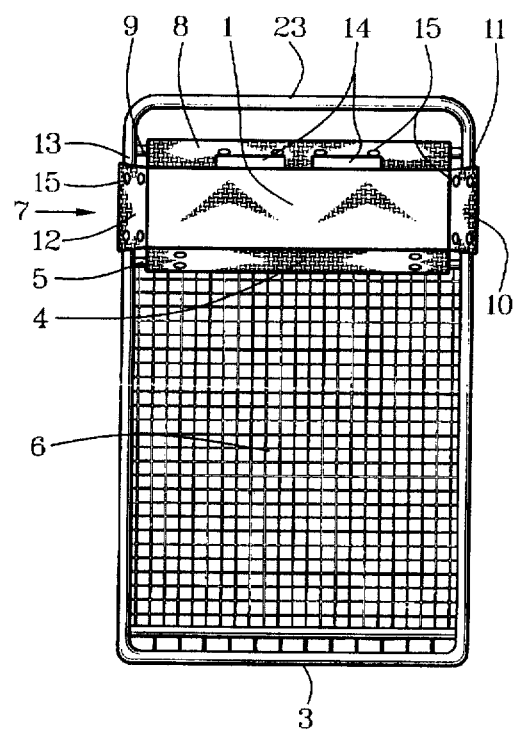
FIG. 4 is a top view of a shopping cart on which a child-seat cover is positioned.

Reference is made first to FIGS. 1–4 in the drawings. A shopping-cart child-seat cover has a seat section 1 that is sized and shaped to fit on top of a seat bottom 2 of a child seat in a shopping cart 3. A back section 4 of the child-seat cover is sized and shaped to fit against and over a top of a back wall 5 of the child seat that separates a container portion 6 of the shopping cart 3 from a child-seat portion 7, also referred to as a child seat 7, of the shopping cart 3. A front section 8 of the child-seat cover is sized and shaped to fit against and over a top of a front wall 9 of the child-seat portion 7. Vertically below the child-seat portion 7, the front wall 9 also is a back wall of the container portion 6 in most types of shopping carts 3. A first side section 10 of the child-seat cover is attached to a first side of the seat section 1 and is sized and shaped to fit against and over a top of a first side wall 11 of the child-seat portion 7. In a like manner, a second side section 12 of the child-seat cover is attached to a second side of the seat section 1 and is sized and shaped to fit against and over a top of a second side wall 13 of the child-seat portion 7. At least one and preferably two leg apertures 14 are positioned in the front section 8.

Figure 8:
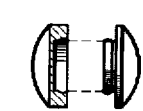
FIG. 8 is a representation of a snap fastener.
Figure 9:
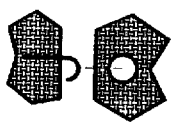
FIG. 9 is a representation of a hook-and-eye fastener.
Figure 10:
FIG. 10 is a representation of a resilient hook-and-loop fastener.

Referring to FIGS. 1–10 and 12–14, cover fasteners are attached to the back section 4, the front section 8, the first side section 10 and the second side section 12 at positions that allow fastening contact of base portions of cover fasteners with matching extended portions of cover fasteners after the sections 4, 8, 10 and 12 have been positioned against and over tops of walls 4, 9, 11 and 13 respectively. The cover fasteners are preferably snap fasteners 15 that are shown in detail in FIG. 8 and depicted generally in FIGS. 1–7 and 12–14. Other types of cover fasteners such as hook-and-eye fasteners 16 shown in FIG. 9 and resilient hook-and-loop fasteners 17 shown in FIG. 10 can be used as appropriate for design preferences.

Referring to FIGS. 2, 5–7 and 12–14, accessory attachments such as a baby-bottle holder 18, toy holders 19, cushion fasteners 20 and a seat belt 21 can be affixed to the child-seat cover in the approximate positions depicted. The baby-bottle holder 18 is preferably a resilient strap having a loop attached to the front section 8. The toy holders 19 also can be strap loops but need not be resilient. The cushion fasteners 20 can be a looped portion of VELCRO® or other type of fastener.

Figure 6:
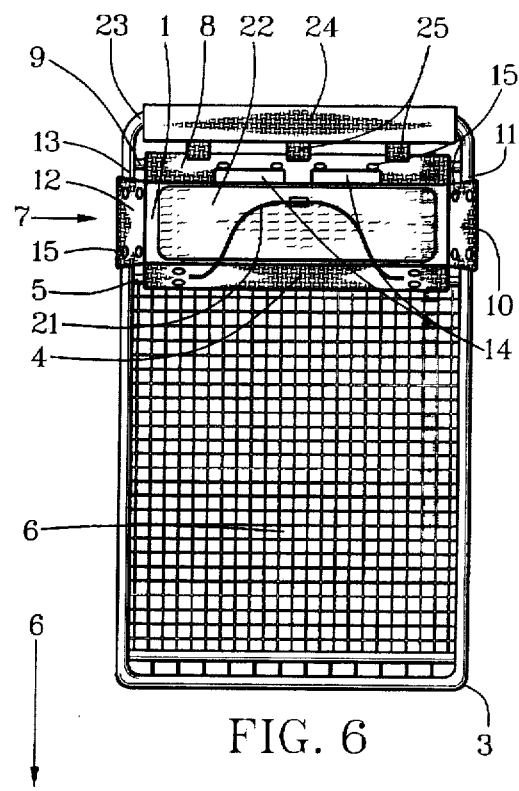
FIG. 6 is a top view of a shopping cart with the FIG. 5 child-seat cover on it.
Figure 7:
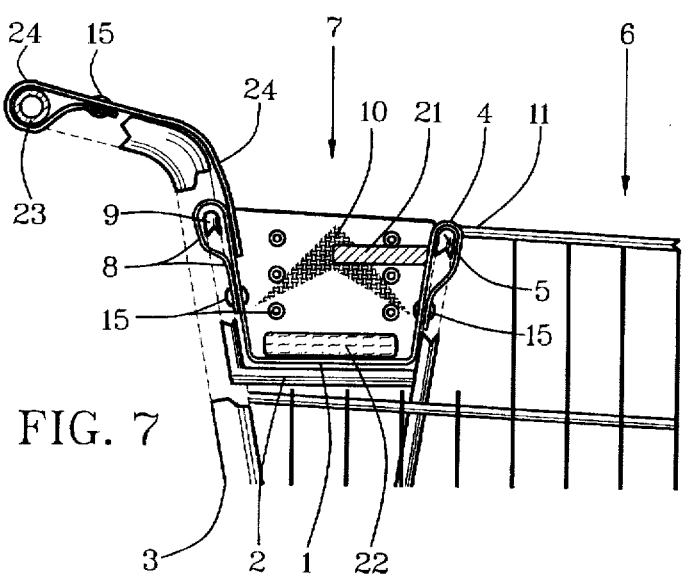
FIG. 7 is an enlarged and partially cutaway fragmentary side view of a shopping-cart child seat with a child-seat cover showing front, back and handle sections fitting against, over tops of and attached to side walls of the shopping-cart child seat.

A cushion 22 shaped generally as depicted in FIGS. 6–7 and 14 can be snap-fit, VELCRO®-fit or otherwise attached to the seat section 1. Other shapes, forms and positioning of cushions 22 are optional. The flat type of cushion 22 shown, however, is most versatile because it can be used to hold a baby lying down or to hold an older infant sitting up. An infant that is old enough to sit up on the cushion 22 also is likely to be strong enough to be held up by the seat belt 21.

Figure 5:
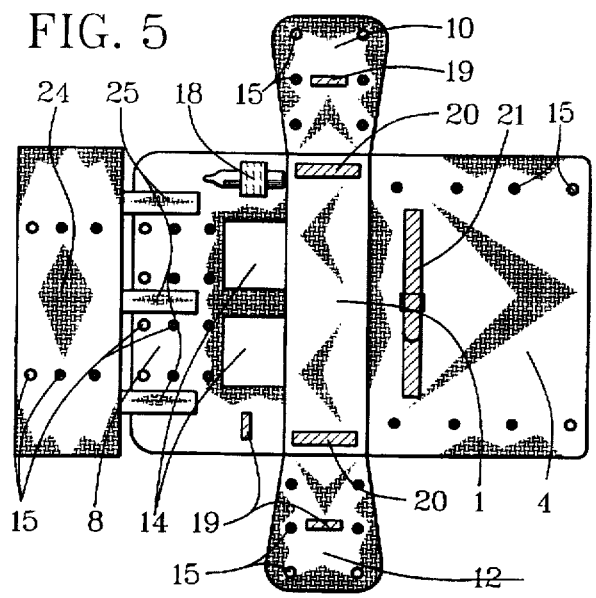
FIG. 5 is the FIG. 2 illustration with a handle cover attached with straps.

A shopping-cart handle 23 can be covered with a handle-cover section 24 that is attached to the front section 8 directly as illustrated in FIG. 13 or attached to the front section 8 with handle-cover straps 25 as shown in FIGS. 5–6. A handle-cover section 24 attached directly to the front section 8 as shown in FIG. 13 would branch off from the front section 8 at a line of attachment. Optionally also, the front section 8 can be extended long enough to cover the shopping-cart handle 23 as shown in FIGS. 12 and 14. The handle-cover section 24 can be shaped variously to provide space for hand-holding the shopping-cart handle 23 is desired.

Figure 11:
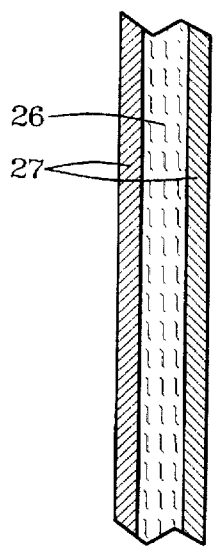
FIG. 11 is an enlarged sectional side view of a cushioned material.

Referring to FIG. 11, material for construction of the child-seat cover can be cushion-layered and relatively thick with a cushion material 26 between outside layers 27. All materials of construction can be freely washable and/or cleanable. Some users will prefer moisture-proof material that can be wiped clean with a cleaner-impregnated wiper and disinfected as desired. Other users will prefer freely washable materials only. Use of the cushion 22 described in relation to FIGS. 5–7 and 12–14 can facilitate use of a less cushiony material that also is less expensive, lighter and easier to handle for construction of the child-seat cover.

A new and useful shopping-cart child-seat cover having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A shopping-cart child-seat cover comprising:

a seat section that is adapted to fit on top of a seat bottom of a shopping-cart child seat;

a back section that is adapted to fit against and over a top of a back wall of the child seat that separates a container portion of a shopping cart from the child seat;

a front section that is adapted to fit against and over a top of a front wall of the child seat that is a back wall of the container portion of the shopping cart;

a first side section attached to a first side of the seat section and adapted to fit against and over a top of a first side wall of the child seat;

a second side section attached to a second side of the seat section and adapted to fit against and over a top of a second side wall of the child seat;

at least one leg aperture in the front section;

cover fasteners positioned on portions of the back section of the child-seat cover at which a portion of the back section that is adapted to be positioned against a back wall of the child seat engages a container-side portion of the back section, that is adapted to hang down from over a top of the back wall of the child seat;

cover fasteners positioned on portions of the front section of the child-seat cover at which a portion of the front section that is adapted to be positioned against a front wall of the child seat engages an outside portion of the front section that is adapted to hang down from over a top of the front wall of the child seat;

cover fasteners positioned on portions of the first side section of the child-seat cover at which a portion of the first side section that is adapted to be positioned against a first side wall of the child seat engages an outside portion of the first side section that is adapted to hang down from over a top of the first side wall of the child seat;

cover fasteners positioned on portions of the second side section of the child-seat cover at which a portion of the second side section that is adapted to be positioned against a second side wall of the child seat engages an outside portion of the second side section that is adapted to hang down from over a top of the second side wall of the child seat; and the child-seat cover is made from a pliable material.

2. A shopping-cart child-seat cover as described in claim 1 and further comprising:

a handle-cover section extended from the front section of the child seat cover;

the handle-cover section being adapted to fit over and around a shopping-cart handle that is oriented horizontally at an aft position on the shopping cart; and at least one handle-cover fastener on the handle-cover section.

3. A shopping-cart child-seat cover as described in claim 1 wherein:

the front section of the child-seat cover is adapted to encompass a shopping-cart handle and to be attached to the shopping cart handle.

4. A shopping-cart child-seat cover as described in claim 1 and further comprising:

child-care-accessory attachments positioned on the child-seat cover; and the child-care-accessory attachments are structured to contain various items.

5. A shopping-cart child-seat cover as described in claim 1 and further comprising:

a body-support strap attached to the child-seat cover.

6. A shopping-cart child-seat cover as described in claim 1 wherein:

the pliable material is washable.

7. A shopping-cart child-seat cover as described in claim 1 wherein:

the pliable material is thick and cushiony.

8. A shopping-cart child-seat cover as described in claim 6 wherein:

the pliable material is thick and cushiony.

9. A shopping-cart child-seat cover as described in claim 1 wherein:

the pliable material is moisture-proof and cleanable.

10. A shopping-cart child-seat cover as described in claim 9 wherein:

the pliable material is thick and cushiony.

11. A shopping-cart child-seat cover as described in claim 1 and further comprising:

cushion attachments on the child-seat cover;

the cushion attachments being positioned to attach at least one child-support cushion onto at least one desired position on the child-seat cover; and the at least one child-support cushion attachable to the child-seat cover with the cushion attachments.

12. A shopping-cart child-seat cover as described in claim 1 wherein:

the cover fasteners are snap fasteners having snap bosses that snap-fit into snap apertures of snap-boss receptacles.

13. A shopping-can child-seat cover as described in claim 1 wherein:

the cover fasteners are hook-and-eye fasteners having hooks that hook onto edges of eye apertures of hook receptacles.

14. A shopping-can child-seat cover as described in claim 1 wherein:

the cover fasteners are resilient hook-and-loop fasteners having a plurality of hook fasteners that engage loops of loop fasteners resiliently.

15. A shopping-can child-seat cover as described in claim 1 wherein:

the front section of the child-seat cover has a handle-cover section that is adapted to encompass a shopping-cart handle and to be attached to the shopping cart handle, child-care-accessory attachments are positioned on the child-seat cover;

the child-care-accessory attachments are structured to contain various items; and the pliable material is washable.

16. A shopping-cart child-seat cover as described in claim 15 wherein:

the pliable material is thick and cushiony.

17. A shopping-cart child-seat cover as described in claim 15 wherein:

the cover fasteners are select fasteners from a group consisting of snap bosses that snap-fit into snap apertures of snap-boss receptacles, hook-and-eye fasteners having hooks that hook onto edges of eye apertures of hook receptacles, and designedly resilient hook-and-loop fasteners having a design plurality of hook fasteners that engage loops of loop fasteners resiliently.

18. A shopping-cart child-seat cover as described in claim 1 wherein:

the front section of the child-seat cover has a handle-cover section that is adapted to encompass a shopping-cart handle and to be attached to the shopping cart handle.

child-care-accessory attachments are positioned on the child-seat cover;

the child-care-accessory attachments are structured to contain various items; and the pliable material is designedly moisture-proof and cleanable.

19. A shopping-cart child-seat cover as described in claim 18 wherein:

the pliable material is thick and cushiony.

20. A shopping-cart child-seat cover as described in claim 18 wherein:

the cover fasteners are select fasteners from a group consisting of snap bosses that snap-fit into snap apertures of snap-boss receptacles, hook-and-eye fasteners having hooks that hook onto edges of eye apertures of hook receptacles, and designedly resilient hook-and-loop fasteners having a design plurality of hook fasteners that engage loops of loop fasteners resiliently.

* * * * *